Sept. 2, 1958 F. A. MORRIS 2,850,700
MODULATOR CIRCUIT
Filed Sept. 26, 1955
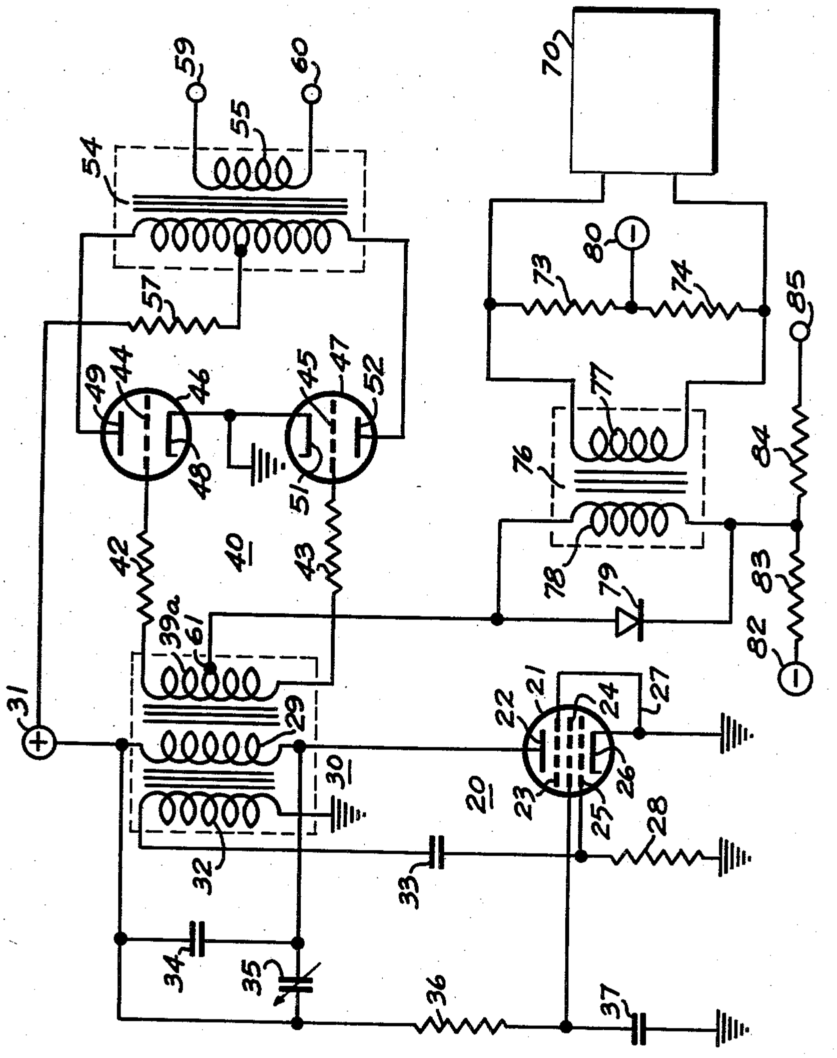
INVENTOR
FRANK A. MORRIS
BY Francis E. Blake
ATTORNEY

2,850,700

MODULATOR CIRCUIT

Frank A. Morris, Rochester, N. Y., assignor to General Dynamics Corporation, a corporation of Delaware Application September 26, 1955, Serial No. 536,574

1 Claim. (Cl. 332—14)

The present invention relates to modulators and, more particularly, to pulse type modulators in which signals of pulse waveform are impressed upon a voltage of alternating waveform.

In certain types of carrier telephone systems, it is desirable that information such as control signals for operating toll ticketing equipment be transmitted from one station to another in addition to the usual speech signals. Such additional information may conveniently be transmitted by means of spaces in the carrier wave, and, in order to utilize the same transmission chanels for various control signals without any interaction between such signals, it has been suggested to use control tones of different frequencies, the frequency of each of the control tones being indicative of the particular function of the equipment to be controlled thereby. Because telephone equipment is generally designed for operation within the audio frequency band, these various control tones are arranged within the audio frequency spectrum, and, so as to avoid cross modulation and other interferences, these control tone frequencies are located either above or below the band employed for transmitting the voice frequency information. Bandpass filters are connected to the transmission channel at the receiving station to selectively translate respective ones of the control tones to the various portion of the toll ticketing equipment to be operated thereby.

Since the modulating control signals or pulses may recur at an audio rate within the frequency band allotted for transmitting the voice information, it is important to prevent the application of these pulses to the telephone line. This may be accomplished by the use of bandpass filters but because these pulses inherently have a high db rating, the cost of suitable filters becomes excessive. As a result, it is desirable to provide other means for preventing these pulses from reaching the telephone line.

An object of the present invention is, therefore, to provide a new and improved modulator for pulse modulating an alternating carrier wave.

Another object of the present invention is to provide a new and improved modulation circuit for interrupting the carrier wave at spaced intervals in response to a modulating signal of pulse waveform.

Still another object of the present invention is to provide a new and improved circuit arrangement wherein an alternating carrier wave is pulse modulated with a modulating wave, which modulating wave does not appear, as such, in the modulated carrier wave.

A further object of the invention is to provide a new and improved oscillator for generating a voltage of alternating waveform, which oscillator has extremely high frequency stability.

Briefly, in accordance with the present invention, the above objects are realized by providing a pair of translating channels which are supplied with a voltage of an alternating waveform in phase opposition from a fixed frequency voltage source. The voltage of an alternating waveform is modulated by a voltage of pulse waveform which is supplied to the translating channels in phase.

In accordance with another aspect of the invention, the fixed frequency voltage source comprises an oscillator including a pentode having a three winding transformer, one winding of which is energized from the anode circuit thereof, another of the windings providing feedback to the grid circuit and the third winding providing a convenient means for extracting the voltage of alternating waveform from the oscillator.

The invention, both as to its organization and method of operation, together with further objects and advantages thereof are best understood by reference to the following detailed description taken in connection with the single figure of the accompanying drawing in which is schematically illustrated a pulse modulation circuit embodying the present invention.

Referring now to the drawing, there is shown an oscillator 20, which generates a carrier voltage of alternating waveform, a source of voltage of pulse waveform 70, and a push-pull amplifier 40. The alternating voltage wave from the oscillator 20 is supplied in phase opposition to the two channels of the amplifier 40, and the voltage wave of pulses is supplied in phase to both of these channels, thereby to simultaneously affect the transmission characteristics thereof in like manner. In order to insure the complete interruption of the translation of the alternating carrier wave through the amplifier 40, it is necessary that the pulses be of greater amplitude than the wave supplied from the oscillator 20, but, because these pulses are balanced out in the amplifier 40, they do not appear in the output thereof. Consequently, the necessity of utilizing expensive bandpass filters to remove these objectionable pulses from the output of the amplifier 40 is obviated in a convenient, reliable, and economical manner.

Considering the circuit embodying the invention in greater detail, the oscillator 20 includes a multiple electrode discharge device 21 which is provided with an anode 22, a suppressor electrode 23, a screen electrode 24, a control electrode 25, and a cathode 26, the cathode 26 being connected by means of a conductor 27 to the suppressor grid 23 for energization of the suppressor grid in the conventional manner. In order to determine the frequency of the output voltage from the device 21, an inductor 29 and a capacitor 34 are connected in parallel so as to form a high Q tank circuit. The inductor 29 is one winding of a transformer 30 and is interconnected between the anode 22 and a B+ terminal 31 so as to couple energizing voltage from the terminal 31 to the anode 22. A feedback winding 32 on the transformer 30 is magnetically coupled to the winding or inductor 29 and is serially connected with a capacitor 33 between the control electrode 25 and ground, thereby to provide a feedback path between the anode circuit and the control electrode circuit of the discharge device 21. A grid leak resistor 28 is connected in the usual manner.

To facilitate accurate adjustment of the output frequency of the oscillator 20, a variable capacitor or trimmer 35 is connected across the tank circuit. A resistor 36 is connected between the junction of the capacitors 34 and 35 and the screen electrode 24 to supply an energizing voltage thereto, and a bypass capacitor 37 is connected in the conventional manner between the screen electrode 24 and ground.

The Q of the resonant tank circuit is selected to be relatively high so that the impedance thereof increases sharply at resonance, and, since the pentode 21 has an inherently high anode resistance, good frequency stability is achieved while providing an output voltage of relatively high amplitude. Furthermore, the use of a pentode in the oscillator 20 provides high gain while requiring only a relatively small change in the input voltage signal to the grid 25 to provide complete control over the output voltage.

As is well known in the art, the voltage waves appearing at the respective ends of an output winding 39*a* of the transformer 30 are 180 degrees out of phase, thereby permitting the direct supplying of the output of the oscillator 20 to the push-pull amplifier 40. Accordingly, the waves appearing at the opposite ends of the winding 39*a* are coupled through a pair of coupling resistors 42 and 43 to the control electrodes 44 and 45 of a pair of triode amplifier discharge devices 46 and 47, respectively. The triode 46 is also provided with a cathode 48 and an anode 49, and the triode 47 is provided with a cathode 51 and an anode 52. As above indicated, the triodes 46 and 47 are connected in a conventional push-pull relationship to supply the output signal thereof to an output transformer 54 having a primary winding 56 connected between the anodes 49 and 52. A secondary winding 55 of the transformer 54 is connected to a pair of terminals 59 and 60 which are adapted to be connected to a utilization means such as a telephone line. To provide an energization voltage for the triodes 46 and 47, the center tap of the primary winding 56 of the transformer 54 is connected through a suitable anode resistor 57 to the B+ terminal 31, and the cathodes 48 and 51 are connected directly to ground.

Therefore, as thus far described, the alternating voltage which is generated in the oscillator 20 and which appears across the output winding 39*a* of the transformer 30 is supplied in phase opposition to the push-pull arrangement of the triode amplifiers 46 and 47 to effect, across the output winding 55 of the transformer 54, a signal having the frequency of the wave generated in the oscillator 20.

As previously indicated, it is desirable to pulse modulate the alternating voltage or carrier wave in a manner to provide spaces in the carrier wave at which no voltage occurs, and it is further desirable that the modulating signal not be present in the resultant pulse modulated carrier wave. Accordingly, the generator 70 provides a negatively polarized wave which is coupled to a center tap 61 on the winding 39*a*, thereby to be supplied in phase to the control grids 44 and 45 to similarly bias the triodes 49 and 51. As a result, the transmission characteristics of both channels of the amplifier 40 are simultaneously affected in like manner, and, since the outputs of these amplifiers are balanced for in phase input voltages, the modulating wave from the source 70 does not appear in the transformer 54.

Considering in detail the manner in which the modulating wave from the source 70 is polarized and fed to the amplifier 40, a coupling transformer 76, provided with a primary winding 77 and a secondary winding 78, is interconnected between the source 70 and the center tap 61. A unidirectional impedance device 79 is connected across the secondary winding 78 for polarizing the output of the transformer 76 so that only negative spikes of voltage are coupled to the center tap 61. Even though the modulating pulses from source 70 are polarized so as to supply negative pulses to the amplifier 40, because of the possible differentiation action of the coupling transformer 76, the use of the polarizing device 79 is desirable.

In the event that switches are connected in the lines between the transformer 76 and the source 70, a pair of identical wetting resistors are connected across the primary winding 77, and a source of direct voltage is connected to the junction of these resistors through the terminal 80. As is known in the art, the use of wetting resistors in conjunction with a direct voltage tends to reduce contact problems. It will be understood, of course, that this wetting arrangement may be eliminated if desired, especially in cases where the output pulses from the source 70 are directly coupled to the winding 77.

As shown in the drawing, a negative bias voltage is connected between the control electrodes and cathodes of the triodes 45 and 46 from a terminal 82 to which is connected a source of negative direct voltage. This negative biasing voltage provides a means for controlling the application of the carrier signal to the output transformer 54 and also controls the effectiveness of the modulator afforded by the signal source 70. More specifically, the lower terminal of the secondary winding 78 is connected to a voltage divider comprising a pair of resistors 83 and 84 which are connected between the terminal 82 and terminal 85. The terminal 85 is adapted to be connected to ground through the switching contacts of a relay (not shown). Therefore, the potential which is developed at the junction of the resistors 83 and 84 is superimposed upon the negative pulses from the modulating signal. By selecting the resistance value of resistor 83 to be considerably greater than that of resistor 84, when the terminal 85 is disconnected from ground by an external control circuit, the triodes 46 and 47 are cut off by the negative biasing voltage at the terminal 82 and the carrier wave does not appear at the output terminals 59 and 60. When the terminal 85 is grounded, the negative voltage is dropped across the resistor 83 to lower the bias on the amplifiers 46 and 47 so that the carrier wave generated by the oscillator 20 is continuously amplified and supplied through the output terminals 59 and 60 to provide a control tone having the frequency of the output wave from oscillator 20. Further, when the biasing potential at the terminal 82 is thus reduced, the pulses from the source 70 are effective to render the triodes 46 and 47 nonconductive during the on periods of these pulses. The reduced value biasing voltage supplied to the triodes 45 and 46 is such that the amplifier 40 acts as a clipper to provide a constant amplitude output signal.

Since the operation of the modulator circuit of the present invention will be clear to those skilled in the art from the reading of the above description, a detailed description of such operation is not set forth. Briefly, however, in order to permit conduction in the discharge devices 46 and 47, the terminal 85 is first connected to ground by suitable switching means. Having thus grounded the terminal 85 so as to establish a reduced negative bias voltage between the control electrodes and their respective cathodes in both of the translating channels of the push-pull amplifier 40, the output signal from the oscillator 20 which appears across the output winding 39*a* of the transformer 30 is amplified and limited so as to provide a carrier wave having a constant amplitude at the output terminals 59 and 60. When a negative pulse is supplied from the source 70, the triodes 46 and 47 are cut off to interrupt the development of a voltage wave of carrier frequency and thus produce a space of substantially zero energy level in the carrier wave which appears between the terminals 59 and 60. The modulation circuit is rendered ineffective to transmit the control tone or carrier signals by removing ground from the terminal 85 to cause the application of the full negative biasing potential to the control grids of the amplifier 40, thereby preventing the further application of the carrier wave to the output of the modulation circuit.

While there has been described what is at present considered to be the preferred embodiment of the invention, it will be understood that various modifications may be made therein which are within the true spirit and scope of the invention as defined in the appended claim.

What is claimed as new and is desired to be secured by Letters Patent of the United States is:

A pulse modulator comprising an audio frequency oscillator including a discharge device, said discharge device having at least an anode, a cathode and a grid, a transformer having a first winding connected in the anode-to-cathode circuit of said device, a second winding on said transformer being connected in the grid-to-cathode circuit of said device to provide a regenerative feedback path for said device, a third winding on said transformer, an amplifier comprising a pair of discharge devices connected in push-pull relationship, the input circuits of said pair of discharge devices being respectively connected to opposite ends of said third winding, a source of voltage of pulse waveform, a differentiation means connected to be supplied with a voltage of pulse waveform from said source and operable to produce differentiated pulses, a rectifier connected to the output of said differentiation means to polarize the differentiated pulses therefrom, and means connecting the polarized pulses from said rectifier to an intermediate point on said third winding in order to cut off the conduction of both of the discharge devices in said amplifier when the differentiated pulses are supplied to said third winding.

References Cited in the file of this patent

UNITED STATES PATENTS

| | | |
|---|---|---|
| 1,898,181 | Hansell | Feb. 21, 1933 |
| 2,214,573 | Booth | Sept. 10, 1940 |
| 2,227,157 | Roder | Dec. 31, 1940 |
| 2,456,961 | Lee | Dec. 21, 1948 |
| 2,597,038 | Scully | May 20, 1952 |

FOREIGN PATENTS

| | | |
|---|---|---|
| 627,305 | Great Britain | Aug. 5, 1949 |